A. MATHERN.
MACHINE FOR MANUFACTURING PNEUMATIC TIRES.
APPLICATION FILED OCT. 3, 1910.

1,009,765.

Patented Nov. 28, 1911.

2 SHEETS—SHEET 1.

Witnesses:
H C Hunsberger
Everett Lancaster

Inventor:
Alphonse Mathern
By B. Singu
Attorney.

A. MATHERN.
MACHINE FOR MANUFACTURING PNEUMATIC TIRES.
APPLICATION FILED OCT. 3, 1910.
1,009,765.
Patented Nov. 28, 1911.
2 SHEETS—SHEET 2.
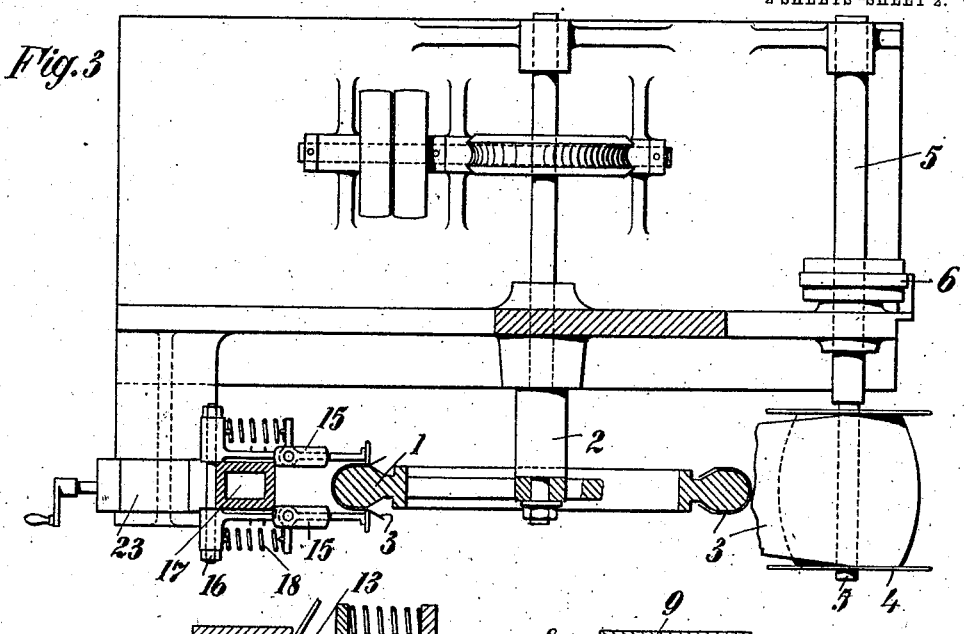
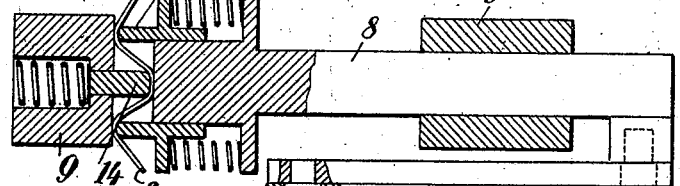
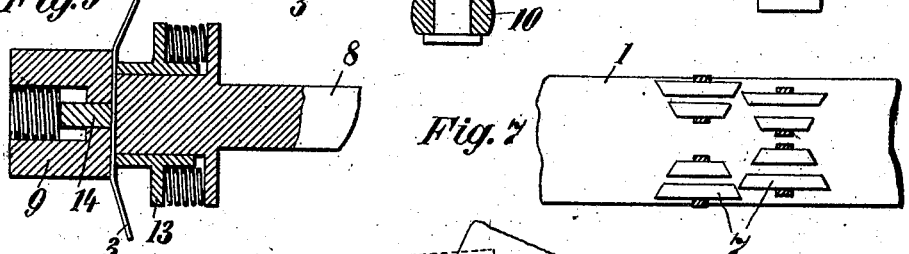
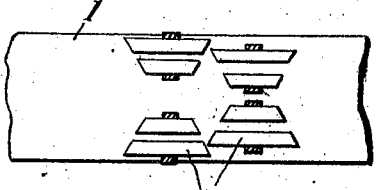
Witnesses:
Inventor:
Alphonse Mathern
By B. Singh
Attorney

UNITED STATES PATENT OFFICE.

ALPHONSE MATHERN, OF BERLIN, GERMANY.

MACHINE FOR MANUFACTURING PNEUMATIC TIRES.

1,009,765.

Specification of Letters Patent. Patented Nov. 28, 1911.

Application filed October 3, 1910. Serial No. 585,164.

*To all whom it may concern:*

Be it known that I, ALPHONSE MATHERN, engineer, a citizen of the French Republic, residing at 19ª Glogauerstrasse, Berlin, S. O. 36, Kingdom of Prussia, Germany, have invented certain new and useful Improvements in Machines for Manufacturing Pneumatic Tires, of which the following is a specification.

The present invention relates to a machine for making pneumatic tires for automobiles and consists of a device allowing of suppressing the folds formed in the canvas when the latter is laid around the core, at the same time insuring a reliable sticking of the said canvas to the core and of the several superimposed layers of canvas to each other.

A pneumatic tire for automobile consists essentially of a carcass composed of several layers of canvas covered with caoutchouc and stuck on each other. These layers of fabric are in the course of manufacture laid on a special former termed the core-ring. On both sides folds will be formed in great number and it will be necessary to first remove these pleats before the layers of canvas can be stuck together. Heretofore this difficulty was met by pulling the strips of canvas in such a manner as to stretch the middle and thereby admit of suppressing the folds formed at the sides. This method is very bad, as the fabric is thereby deformed at the very part which should maintain its greatest strength.

My machine dispenses with the stretching of the canvas as the folds formed at the sides are removed by means of a special device, so that the several layers of canvas may be stuck together v  c preserving their full strength. It is necessary that the sticking of the several layers of canvas to the core-ring and each other , spectively to be effected in an automatic manner, so that the operator need not touch the canvas, whereby the latter might be soil  and other faults in the sticking together cannot occur and render the pneumatic tire useless. When the smoothing out of the folds and sticking together are effected in an automatic manner, it will be possible to place in one continuous operation several layers of canvas on the core-ring without it being necessary to stop the machine.

Figure 1:
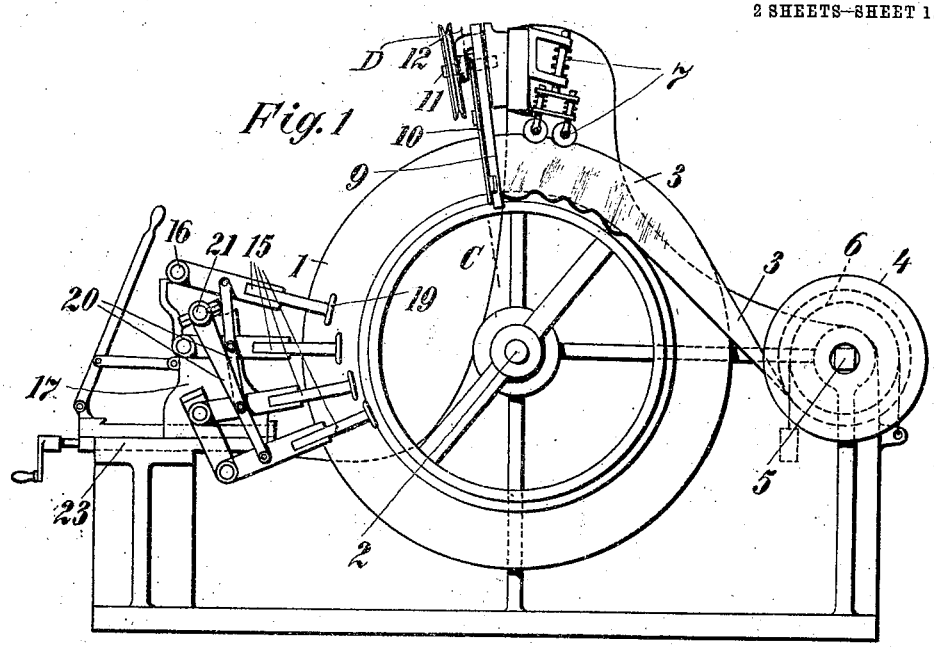
Figure 2:
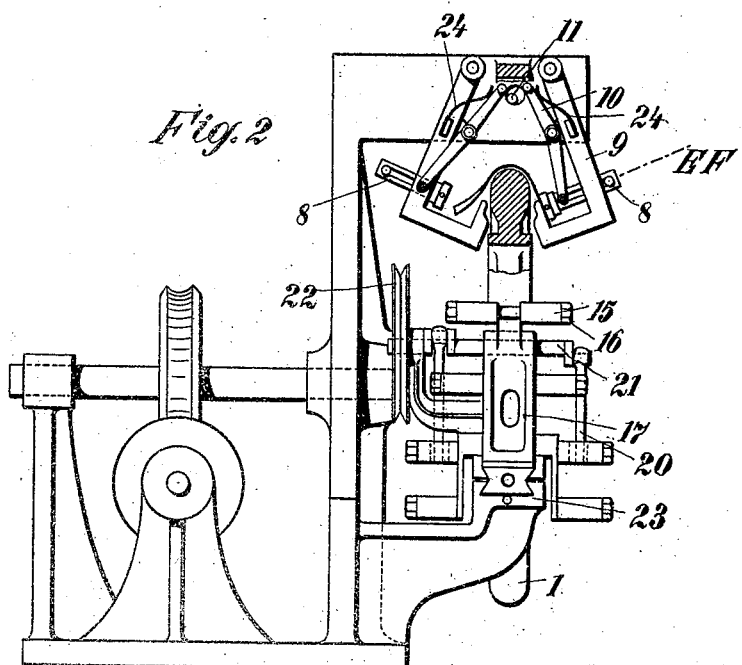

In the accompanying drawings: Figure 1 is a front view of the machine; Fig. 2 is a side view with part-section along the line C—D in Fig. 1; Fig. 3 is a plan view with part-section along the line A—B in Fig. 1; Figs. 4 and 5 are sectional plan views of the device for removing the pleats; Fig. 6 is a diagram, showing the travels of the ends of the levers; Fig. 7 is a top view showing the arrangement of the rollers serving to stick the canvas on the top of the core.

In the following I shall now describe my machine.

The core-ring 1, which has the exact shape of the interior of the tire and which is intended to receive the several layers of canvas, is rigidly fitted to the mainshaft 2 of the machine, so as to revolve with the same in the direction of the arrow in Fig. 1.

The canvas band covered with caoutchouc 3 is wound on a drum 4 which is fitted on a square shaft 5. This canvas strip is flat and of a sufficient length so as to go twice or more often around the core-ring 1. For placing the canvas 3 on the core-ring 1 the end of the canvas 3 is applied to the core-ring which has been previously covered with a caoutchouc cement; the machine is then started and the canvas will be unwound from the drum 4 and be wrapped around the outer part of the core-ring, large folds being formed at the sides as shown in Fig. 1. In consequence of the rotation of the core-ring 1 the canvas passes beneath the roller device 7 (Figs. 1 and 7); which consists of a number of independent rollers each pressed under action of a separate spring against the top of the core-ring. The rollers of this device 7 are arranged in such a manner, that each presses on a different part of the top of the core-ring without any air voids being left.

As the core-ring spring 1 continues its rotation the canvas 3 reaches the device serving to flatten the folds (Figs. 1, 2, 4 and 5). This device is arranged so as to compress the canvas in itself, thereby reducing the length of the canvas-band at the sides; it is therefore obvious, that such operation will cause the folds to disappear. This device acts on the sides of the canvas band only. It consists of two main parts 9 in which reciprocate parts 8 actuated by levers 10. These levers 10 are pivoted to parts 9 and receive their oscillating motion from a cam shaft 11, which is rotated by means of a pulley 12, and from springs 24 which tend to force the levers 10 toward the cam shaft 11. The parts 8 will strike against the short ends of parts 9 and at the same time seize the canvas, which is thus pressed between parts 8 and 9. Before part 8 comes in contact with part 9, the small part 14 will be projecting from the middle of part 9, being under the action of a weak spring. In a similar manner part 8 is provided with parts 13 which project from part 8 under action of two springs. Parts 13 will therefore seize the canvas before the part 8 and in consequence of the projecting part 14 the canvas will assume the position shown in Fig. 4.

On part 8 continuing its forward movement, it will force back part 14 and itself pass the canvas 3 which being held on both sides by part 13 is obliged to contract so as to assume the position shown in Fig. 5. When part 8 recedes the canvas will remain in the position according to Fig. 5 as part 14 cannot deform the canvas, its spring being too weak. The part 14 may also be fitted with a locking device so that it remains in the position according to Fig. 5 while part 8 recedes. It is obvious, that by the canvas changing from the position according to Fig. 4 to the position according to Fig. 5 it will be considerably shortened in this place and at the sides of the core-ring the folds will disappear.

After the canvas has left the smoothing device and on the core-ring continuing its rotation, the canvas will meet a system of levers 15. These levers are reciprocated in such a manner that their extreme end describes a circular curve, their paths is clearly shown by the diagram Fig. 6. Each of these levers swivels on a fixed pivot 16 secured to a cast iron body. The levers are articulated in the middle and their free ends are pressed under action of springs 18 against the core. On the ends of these levers are fitted rollers 19 which roll in circular lines on the core.

It is evident that each lever roller will engage a given part of the canvas corresponding to the path of the roller at its end and when the lowered lever has completed its operation, the canvas will be completely adhered and on rotation being continued, a number of layers of canvas may be cemented after each other and in continuous operation.

The levers 15 are coupled to each other by means of connecting rods 20 and are actuated by means of shaft 21 and pulley 22. The body 17 is fitted on a two-way slide 23 so that the position of the levers 15 may be adjusted and they may be withdrawn when the work has been completed, whereupon they are returned into operative position when fresh canvas is to be placed on a new core.

I claim:

1. In a machine for manufacturing pneumatic tires consisting of a drum containing the canvas band a brake adapted to control the unwinding of said drum, a wheel core, driven by suitable gearing; a plait reducing device consisting of members, pivotally arranged on either side of the core, spring controlled slides in said members having side projections spring controlled plungers, and means for actuating said plungers.

2. In a machine for manufacturing pneumatic tires consisting of a drum containing the canvas band, a brake adapted to control the unwinding of said drum, a wheel core, driven by suitable gearing; a cementing device consisting of a plurality of spring controlled pivotally arranged levers, links connecting said levers rollers fitted to the ends of said levers and bearing against the canvas on the sides of the core, means for reciprocating said levers in a vertical direction, and means for withdrawing said levers from the core.

3. In a machine for manufacturing pneumatic tires consisting of a drum containing the canvas band, a brake to control the unwinding of said drum, a wheel core, the combination of a pressure attachment, consisting of a plurality of spring controlled pressure rollers arranged, that each roller operates on another part of the canvas, and all rollers complement each other to the area of the upper face of the canvas; and a plait reducing device consisting of members pivotally arranged on either side of the core, spring controlled slides in said members having projections spring controlled plungers, and means for actuating said plungers; and a cementing device consisting of a plurality of spring controlled pivotally mounted levers links connecting said levers and having rollers bearing against the canvas on the sides of the core, means for reciprocating said levers in a vertical direction, and means for withdrawing said levers from the core.

4. A machine for placing and cementing canvas to the core-ring for making the outer covers of pneumatic tires consisting of a main body, a drum on which the canvas band is wound, a rotatable shaft to which the core-ring is exchangeably fitted, a pressure attachment composed of spring controlled rollers, each roller pressing against a different point of the top of the core-ring, and means for sticking the sides of the canvas to the core, substantially as described.

5. A machine for placing and sticking the canvas to the core-ring for making the outer covers of pneumatic tires consisting of a main body, a drum on which the canvas band is wound, a rotatable shaft to which the core-ring is exchangeably fitted, a pressure attachment comprising spring controlled rollers, each roller pressing against another point of the top of core-ring, means causing the canvas to contract in at the sides, a system of levers pivoted at one end and carrying rollers at their other ends and arranged at both sides of the core-ring, said levers being articulated in their middle, springs for forcing the rollers at the ends of said levers against the core-ring, and levers coupled with each other by means of connecting rods, and means for oscillating said levers around their pivots so that the rollers describe arc circles on the core-ring.

6. A machine for placing and sticking the canvas to the core-ring for making the outer covers of pneumatic tires consisting of a main body, a drum on which the canvas band is wound, a rotatable shaft to which the core-ring is exchangeably fitted, a pressure attachment comprising spring actuated rollers, each roller pressing against another point of the top of the core-ring, means causing the canvas to contract in at the sides, a system of levers pivoted at one end and carrying rollers at their other ends and arranged at both sides of the core-ring, said levers being articulated in their middle, springs forcing the rollers at the ends of said levers against the core-ring, said levers being coupled with each other by means of connecting rods, and means for oscillating said levers around their pivots, said levers being arranged on a two-way adjustable slide.

7. The combination of a machine as specified, of a revoluble core to sustain the layer or strip, and means engaging both sides of a portion of the strip to flatten the same, substantially as described.

8. The combination of a machine as specified, of a revoluble core to sustain the layer or strip, and means engaging both sides of the marginal portion of the strip to flatten the same, substantially as described.

9. The combination of a machine as specified, of a revoluble core for sustaining the layer or strip, and means engaging both sides of the margin of the strip to flatten the same, said means including co-acting yieldingly mounted and rigid elements, substantially as described.

10. The combination of a machine as specified, of a revoluble core to sustain the layer or strip, and means retaining the margin of the strip in spaced relation to the core and acting on such margin to flatten the same, substantially as and for the purposes set forth.

11. The combination of a machine as specified, of a revoluble core to sustain the layer or strip, and means engaging both sides of the margin and holding the same in spaced relation from the core to flatten the same, substantially as described.

12. The combination of a machine as specified, of a revoluble core to sustain the layer or strip, means holding the margin of the strip in spaced relation to the core and flattening the same, and means subsequently adhering the flattened margins, substantially as and for the purposes set forth.

13. The combination of a machine as specified, of a revoluble core to sustain the layer or strip, means engaging the tread portion and comprising a plurality of elements spaced apart from each other and arranged in staggered relation to engage the tread at different points with respect to the center thereof, the tread engaging portions of said elements being of different contours corresponding to their location on the tread, substantially as described.

14. A tire making machine comprising in combination, a revoluble core for supporting the strip, and means for sticking the sides or margins of the strip and comprising a plurality of pivotally mounted swinging rolling elements arranged and disposed so that the range of swinging movement of one element will intersect the path of another of such elements, substantially as described.

15. A tire making machine comprising in combination, a revoluble core for supporting the strip, and means for sticking the sides or margins of the strip comprising a plurality of pivotally mounted swinging elements arranged and disposed so that the range of swinging movement of one element will intersect the range of movement of another of such elements, substantially as described.

In testimony whereof I affix my signature in presence of two witnesses.

ALPHONSE MATHERN.

Witnesses:
WOLDEMAR HAUPT,
HENRY HASPER.

---

Copies of this patent may be obtained for five cents each, by addressing the "Commissioner of Patents, Washington, D. C."